(12) United States Patent
Powell et al.

(10) Patent No.: US 7,421,386 B2
(45) Date of Patent: Sep. 2, 2008

(54) FULL-FORM LEXICON WITH TAGGED DATA AND METHODS OF CONSTRUCTING AND USING THE SAME

(75) Inventors: Kevin R. Powell, Kirkland, WA (US); Andrea Jessee, Redmond, WA (US); Douglas W. Potter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 10/804,998

(22) Filed: Mar. 19, 2004

(65) Prior Publication Data

US 2005/0091031 A1 Apr. 28, 2005

Related U.S. Application Data

(60) Provisional application No. 60/513,921, filed on Oct. 23, 2003.

(51) Int. Cl.
*G06F 17/21* (2006.01)
(52) U.S. Cl. .................................. 704/10; 704/4
(58) Field of Classification Search ............. 704/4, 704/10
See application file for complete search history.

(56) References Cited

U.S. PATENT DOCUMENTS

| | | | | |
|---|---|---|---|---|
| 4,384,329 A | 5/1983 | Rosenbaum et al. | ........... | 704/10 |
| 4,672,571 A | 6/1987 | Bass et al. | | |
| 4,688,192 A | 8/1987 | Yoshimura et al. | ............ | 704/10 |
| 4,701,851 A | 10/1987 | Bass et al. | ................. | 364/419 |
| 4,703,425 A | 10/1987 | Muraki | ........................... | 704/7 |
| 4,724,523 A | 2/1988 | Kucera | ......................... | 715/532 |
| 4,736,296 A | 4/1988 | Katayama et al. | ............... | 704/8 |
| 4,771,385 A | 9/1988 | Egami et al. | ................. | 715/532 |
| 4,868,750 A | 9/1989 | Kucera et al. | .................. | 704/8 |
| 4,887,212 A * | 12/1989 | Zamora et al. | ................. | 704/8 |
| 4,969,097 A | 11/1990 | Levin | .......................... | 364/419 |
| 4,991,135 A | 2/1991 | Yoshimura et al. | ............. | 707/3 |
| 5,056,021 A | 10/1991 | Ausborn | ........................ | 704/9 |
| 5,289,376 A | 2/1994 | Yokogawa | .................... | 704/10 |

(Continued)

FOREIGN PATENT DOCUMENTS

EP 0539965 5/1993

(Continued)

OTHER PUBLICATIONS

Branimir Boguraev, David Carter, Ted Briscoe, "A Multi-Purpose Interface to an On-line Dictionary", ACM 1987.

(Continued)

*Primary Examiner*—Abul K. Azad
(74) *Attorney, Agent, or Firm*—Steven M. Koehler; Westman, Champlin & Kelly, P.A.

(57) ABSTRACT

A lexicon stored on a computer readable medium and used by language processing systems. The lexicon can store word information in a plurality of data fields associated with each entered word. The data fields can include information on spelling and grammar, parts of speech, steps that the entered word can be transformed into another word, a word description, and a segmentation for a compound word. Information that cannot be stored in the lexicon can be stored in an intermediate indexes table. Associated methods of constructing, updating and using the lexicon are introduced.

36 Claims, 5 Drawing Sheets

U.S. PATENT DOCUMENTS

| | | | |
|---|---|---|---|
| 5,611,076 A | 3/1997 | Durflinger et al. | 707/102 |
| 5,642,522 A | 6/1997 | Zaenen et al. | 715/532 |
| 5,708,829 A | 1/1998 | Kadashevich et al. | 715/531 |
| 5,715,468 A | 2/1998 | Budzinski | 704/9 |
| 5,761,688 A | 6/1998 | Morishita | 715/532 |
| 5,789,057 A | 8/1998 | Naitou et al. | 428/17 |
| 5,799,268 A | 8/1998 | Boguraev | 704/9 |
| 5,867,812 A | 2/1999 | Sassano | 704/10 |
| 5,995,922 A * | 11/1999 | Penteroudakis et al. | 704/9 |
| 5,995,992 A | 11/1999 | Eckard | 708/497 |
| 6,021,409 A | 2/2000 | Burrows | 707/102 |
| 6,035,268 A | 3/2000 | Carus et al. | 704/9 |
| 6,081,774 A | 6/2000 | De Hita et al. | 704/9 |
| 6,138,087 A | 10/2000 | Budzinski | 704/9 |
| 6,233,553 B1 | 5/2001 | Contolini et al. | 704/220 |
| 6,278,967 B1 | 8/2001 | Akers et al. | 704/2 |
| 6,278,968 B1 | 8/2001 | Franz et al. | 704/3 |
| 6,298,321 B1 | 10/2001 | Karlov et al. | 704/10 |
| 6,393,389 B1 * | 5/2002 | Chanod et al. | 704/7 |
| 6,424,983 B1 | 7/2002 | Schabes et al. | 707/533 |
| 6,675,169 B1 | 1/2004 | Bennett et al. | 707/101 |
| 6,708,829 B2 | 3/2004 | Robertson | 209/399 |
| 6,735,559 B1 | 5/2004 | Takazawa | 704/7 |
| 6,760,695 B1 | 7/2004 | Kuno et al. | 704/9 |
| 6,792,418 B1 | 9/2004 | Binnig et al. | 707/3 |
| 6,965,858 B2 * | 11/2005 | Kempe | 704/9 |
| 7,089,188 B2 | 8/2006 | Logan | 704/260 |
| 2003/0204392 A1 | 10/2003 | Finnigan | |
| 2003/0233235 A1 | 12/2003 | Park | 704/257 |
| 2005/0091030 A1 | 4/2005 | Jessee | 704/4 |
| 2005/0091031 A1 | 4/2005 | Powell | 704/10 |
| 2005/0091033 A1 | 4/2005 | Valdes | 704/8 |

FOREIGN PATENT DOCUMENTS

| | | |
|---|---|---|
| WO | WO 99/50829 | 10/1999 |

OTHER PUBLICATIONS

M.Nagao,et al.,"An Attempt to Computerized Dictionary Data Bases", ACL,1980.

C.J. Wells, et al.,: "Fast Dictionary Look-up for Contextual Word Recognition" Pattern Recognition, [Online] vol. 23, No. 5, 1990, pp. 501-508.

A. Ntoulas et al.: "Use of a Morphosyntactic Lexicon as the Basis for the Implementation of the Greek Wordnet" Lecture Notes in Computer Science, 2000.

Fredkin E.: "Trie Memory" Communcations of the Association for Computing Machinery, ACM, New York, NY, US, vol. 3, No. 9, Aug. 1960 (1960-68), pp. 490-499.

Bleam, T., "(Non-) Parallels between Double Object Constructions and Spanish IO Clitic-doubling", Paper presented at LSRL 31, Chicago, Apr. 22, 2001.

Bodik, P. and M. Takac, "Formation of a Common Spatial Lexicon and its Change in a Community of Moving Agents", *Fontiers in AI:Proceedings of Scandinavian Conference on Artificial Intelligence—SCAI 2003*, http://www.cs.berkeley.edu/~bodikp/publications/scai03.pdf.

Bozsahin et al., H., "A Categorial Framework for Composition in Multiple Linguistic Domains", In Proceedings of the 4th International Conference on Cognitive Science of NLP, Dublin, CSNLP'95, Jul. 1995.

Branco et al., A., "Tokenization of Portuguese: resolving the hard cases", Technical Report TR-2003-4, Department of Informatics, University of Lisbon, Mar. 2003.

Chang, Echa; Huang, Chu-Ren; et al. "Induction of Classification from Lexicon Expansion". *Proceedings of the First International WordNet Conference Jan. 21-25, 2002*. Central Institute of Indian Languages, 2002. pp. 155-164.

Crabbe, Benoit, "Lexical Classes for Structuring the Lexicon of a Tag", *Proceedings of the European Summer School on Logic, Language and Information 2003*, http://www.loria,fr/~crabbe/doc/lexclasses.pdf.

Giguet et al., E., "From Part of Speech Tagging to Memory-based Deep Syntactic Analysis", *In* Proceedings of the International Workshop on Parsing Technologies, (IWPT'97), pp. 77-88, MIT, Boston, Massachusetts, USA, Sep. 17-20, 1997.

Göni et al., J., "A framework for lexical representation", AI95: Fifteenth International Conference. Language Engineering, Montpellier, Francia, pp. 243-252, Jun. 1995.

Habash, N., "Matador: A Large-Scale Spanish-English GHMT System", http://www.amtaweb.org/summit/MTSummit/FinalPapers/84-Habash-final.pdf, at least by Feb. 4, 2004.

Hedlund, Turid et al. "Effects of Compound Splitting and N-Gram Techniques". 2002. In *Proceedings of hte Second Workshop of hte Cross-Language Evaluation Forum, CLEF, 2001*. pp. 118-136.

Koehn, Philipp and Kevin Knight. "Empirical Methods for Compound Splitting" EACL 2003, *11th Conference of the European Chapter of the Association for Computational Linguistics 2003*, pp. 187-194. http://www.isi.edu/~koehn/publications/compound2003.pdf.

Marimon, M., "Integrating Shallow Linguistic Processing into a Unification-based Spanish Grammar", presented at COLING 2002: The 17th International Conference on Computational Linguistics, Aug. 29, 2002.

Palomar et al., M., "An Algorithm for Anaphora Resolution in Spanish Texts", Computational Linguistics, vol. 27, No. 4, pp. 546-567, Mar. 2001.

Rayner et al., M., "Adapting the Core Language Engine to French and Spanish", Technical Report CRC-061, Proceedings NLP-IA, Moncton, New Brunswick, May 10, 1996.

Sánchez León, F., "Spanish tagset for the CRATER project", CRATER Internal Document, Mar. 7, 1994.

Verity Internationalization "Enabling E-business in Multiple Languages" Jun. 2001.

Zweigenbbaum, Pierre, et al., "Towards a Unified a Medical Lexicon for French", In *Studies in Health Technology and Informatics. Medical Informatics Europe; The New Navigators: from Professionals to Patients*. 2003 vol. 95, pp. 415-420.

Bozsahin et al., H., "A Categorial Framework for Composition in Multiple Linguistic Domains", In Proceedings of the 4th International Conference on Cognitive Science of NLP, Dublin, CSNLP '95, Jul. 1995.

Sánchez León, F., "Spanish tagset for the Crater project", Crater Internal Documant, Mar. 7, 1994.

Zweigenbaum et al., P., "Towards a Unified Medical Lexicon for French", In Studies in Health Technology and Informatics. Medical Informatics Europe; The New Navigators: from Professionals to Patients, vol. 95, pp. 415-420, 2003.

Goni et al., ARIES: A lexical platform for engineering Spanish processing tools'Natural Language Engineering 3(4), pp.317-345, Cmabridge University Press, 1997.

Grimshaw, Jane. Optimal Clitic Positions and the Lexicon in Romance Clitic Systems', Rutgers University. Oct. 1999 Http://roa.rutgers.edu/files/374-0100/374-0100/374-0100-GRIMSHAW-0-0.PDF.

M. Nagao, An Attempt To Computerized Dictionary Data Bases, Department of Electrical, ACL, 1980.

C.J. Wells, it al., Fast dictionary look-up for contextual word recognition Source Pattern Recognition, vol. 23, Issue 5 (1990), pp. 501-508, Year of Publication: 1990.

A. Ntoulas et al.: "use of a Morphosyntactic Lexicon as the Basis for the Implementation of the Greek Wordnet". Source: Lecture Notes In Computer Science; vol. 1835, Proceedings of the Second International Conference on Natural Language Processing, pp. 49-56, Year of Publication: 2000.

Fredkin E.: "Trie Memory", Communications of the ACm, vol. 3, Issue 9 (Sep. 1960), pp. 490-499, Year of Publication: 1960.

Verity Internationalization "Enabling E-business in Multiple Lanuages" 2001.

* cited by examiner

| WORD 401 | SPELLING AND DYNAMIC SEGMENTATION 402 | POS 404 | LEMMA DELTA 406 | DESCRIPTION 408 | STATIC SEGMENTATION MASK 410 |
|---|---|---|---|---|---|
| WORD 403 | 412 | 414 | 416 | 418 | 420 |
| ⋮ | ⋮ | ⋮ | ⋮ | ⋮ | ⋮ |
| WORD 405 | 432 | 434 | 436 | 438 | 440 |

FULL-FORM LEXICON WITH TAGGED DATA AND METHODS OF CONSTRUCTING AND USING THE SAME

The present application is based on and claims the benefit of U.S. provisional patent application Ser. No. 60/513,921, filed Oct. 23, 2003, the content of which is hereby incorporated by reference in its entirety.

CROSS-REFERENCE TO RELATED APPLICATIONS

Reference is hereby made to the following co-pending and commonly assigned patent applications: U.S. application Ser. No. 10/804,930, filed Mar. 19, 2004, entitled "Compound Word Breaker and Spell Checker" and U.S. application Ser. No. 10/804,883, filed Mar. 19, 2004, entitled "System and Method for Performing Analysis on Word Variants", both of which are incorporated by reference in their entirety.

BACKGROUND OF THE INVENTION

The present invention relates to natural language or text processing. More particularly, the present invention relates to an improved data structure for storing a lexicon and methods of constructing and using the same.

Natural language or text processing encompasses many types of systems or applications: word breaking such as for search engines, grammar and spell checking, handwriting and speech recognition, machine translation, text mining, and the like. A common and important component of many natural language processing systems and applications is one or more lexicons.

Generally, the lexicon is a data structure containing information about words, which fall into different types. Word types include base words (or "lemmas"), inflections, and derivatives. Lemmas generally include the simplest form of a word such as "jump" on which other types of words are inflected or derived. A lemma differs from a word stem in that a lemma is a complete word but a word stem is not necessarily so.

Inflections are alternate or inflected forms of a word, typically the lemma, which add affixes (prefixes or suffixes), or that reflect grammatical features such as number, person, mood, or tense. Hence, "jumps," "jumping," and "jumped," and the like are inflections of the lemma "jump." Derivatives are words that are formed from another word by derivation. Thus, "electricity" is a derivative of "electric."

A lexicon can also contain syntactic and semantic information. Syntactic information relates to syntax rules by which words are combined into grammatically correct phrases or sentences. Thus, syntactic information for a word can include whether the word is a noun, verb, adjective, etc. and can include its relationship to one or more other words in the same sentence, such as a subject-verb or verb-object relationship. In contrast, semantic information conveys meaning. Word meaning can include a definition, gender, number, and whether a word is a named entity such as first name, last name, city name, etc. There is some overlap between syntactic and semantic information. For example, number such as singular or plural and gender convey both meaning and are used in accordance with certain syntax rules.

Additionally, a lexicon can contain information useful for the particular type of language processing. For example, information including a word and its segmentation can be stored to aid, for example, a word breaking application. Other syntactic and/or semantic information can be stored to aid other language processing systems such as querying, grammar checking, or spell checking.

Generally, there is a trade-off between computing speed and the amount and detail of information stored in the lexicon. Thus, for example, in a word breaking application, computing speed increases when the lexicon already stores detailed information on various inflections and derivatives of each encountered lemma. Computing speed decreases when the word breaker must systematically break down a word in a query to generate, for example, lemmas and inflections from a queried word.

In operation, a natural language processing system can receive an input word or string of words and access stored information in the lexicon to process the word or words according to system parameters. For example, a search or data retrieval engine using an expansive word stemming system can receive a query such as "dogs" and retrieve from a lexicon stored associated terms (e.g. compounds, lemmas, inflections, derivations, synonyms, named entity, etc.) such as "hounddog," "dog," "dogged," "Collie," or "Lassie." Alternately, a received query can be input as "dogs," "dogged," etc. and the system accesses a lexicon to retrieve the lemma "dog." Such word generation or collapse can be used to broaden (or narrow) a word search depending on system parameters.

Another system such as a grammar or spell checking system could receive a word string such as "He eat a hptdg" and access information stored in a lexicon to correct the sentence to "He eats a hot dog." Likewise, systems such as handwriting and speech recognition, machine translation, text mining, and similar systems can access stored information in the lexicon for further processing according to system parameters.

A lexicon that can be used or adapted to multiple natural language or text processing systems, especially a lexicon that is efficiently stored, easily accessible, and that can be updated would have significant utility.

SUMMARY OF THE INVENTION

A lexicon is stored on a computer readable medium and can be accessed by various language processing systems. The lexicon typically stores word information in a plurality of data fields associated with each word entry. The data fields can include information on spelling and dynamic segmentation, parts of speech, steps that the word can be transformed into another word, a word description, and a segmentation for compound terms. Information that cannot be stored in the lexicon can be stored in an intermediate indexes table.

In one aspect, the lexicon can be used with various applications or embedded with a single application. In another aspect, a method of constructing the lexicon is introduced. Optionally, the method can include updating the lexicon with new words. In still another aspect, the lexicon is constructed for a particular language, such as English. However, a subset lexicon can be constructed that relates to a particular field, such as engineering.

DETAILED DESCRIPTION OF THE
ILLUSTRATIVE EMBODIMENTS

Figure 1:
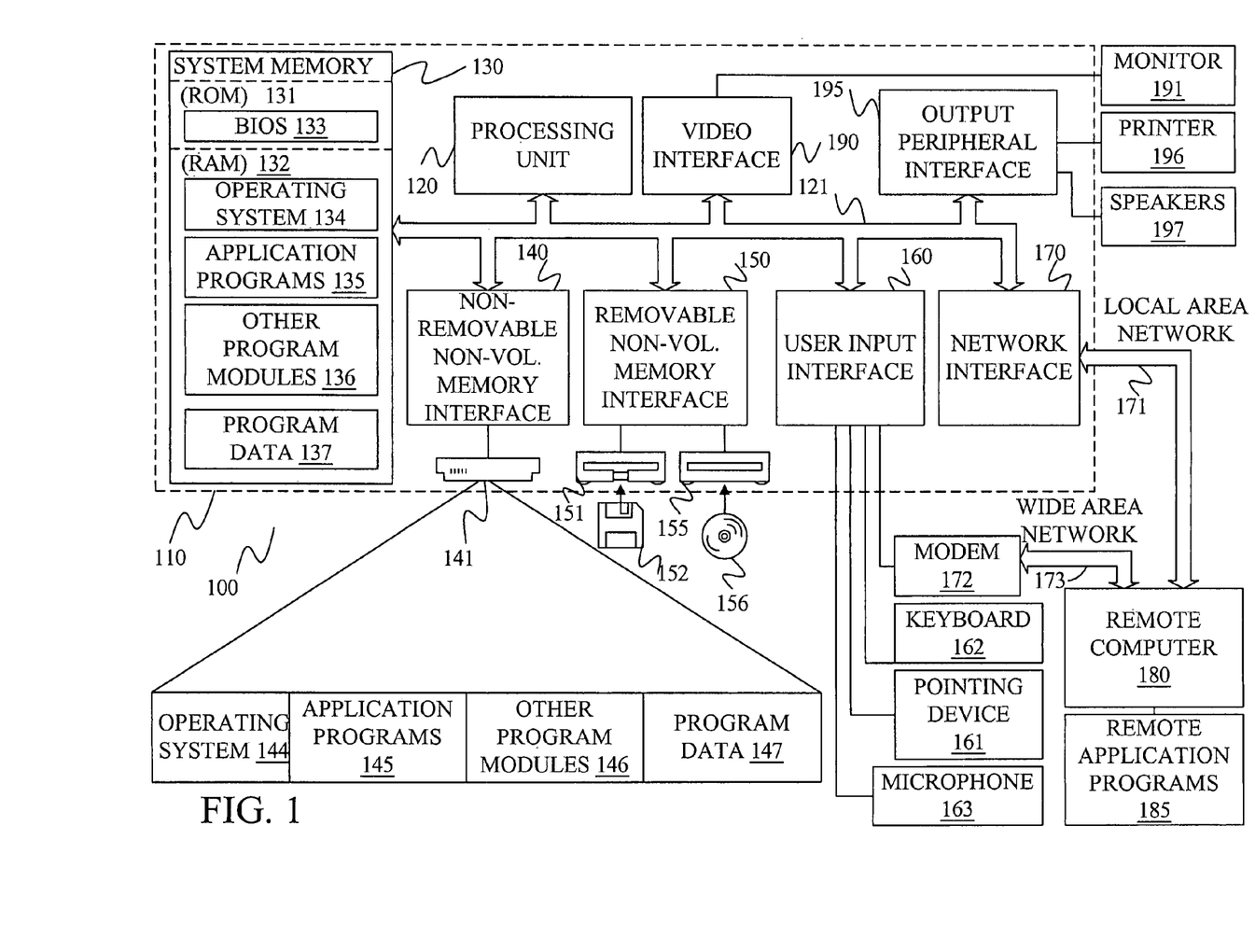
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
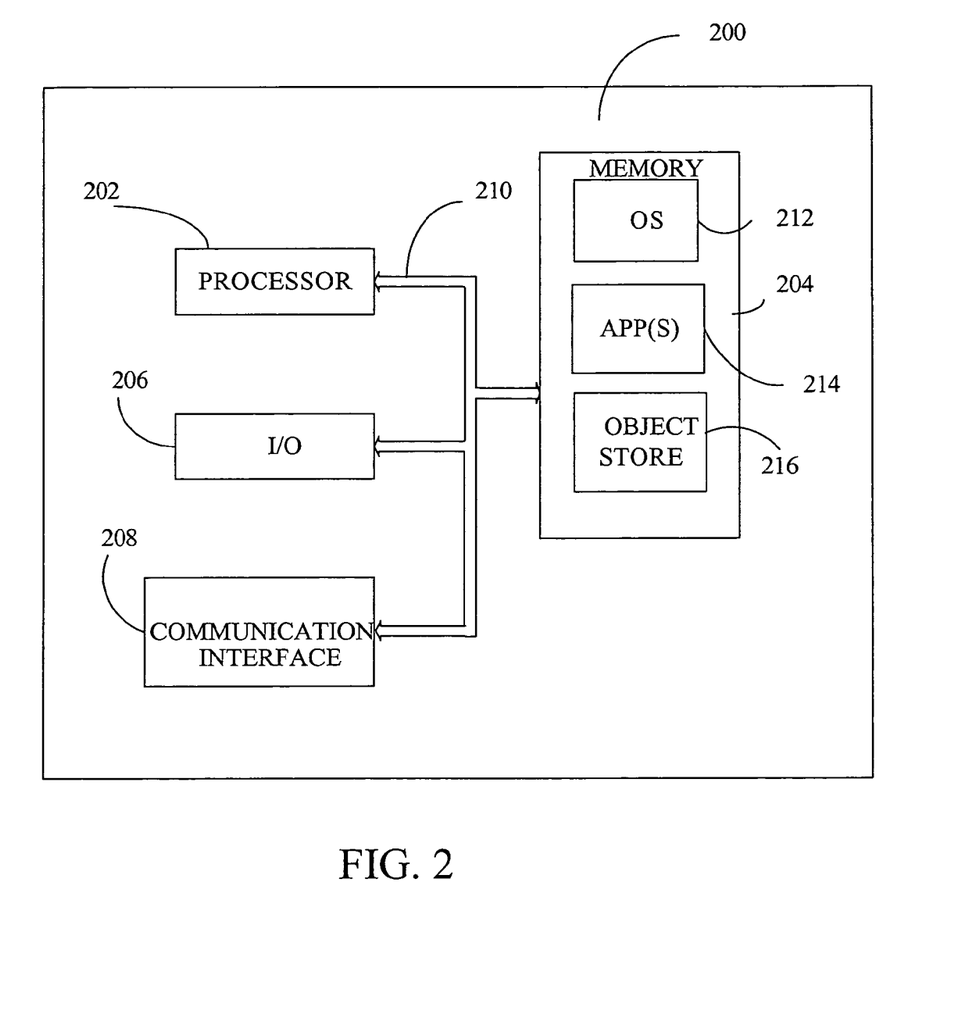
FIG. 2 is a block diagram of a general mobile computing environment in which the present invention may be practiced.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
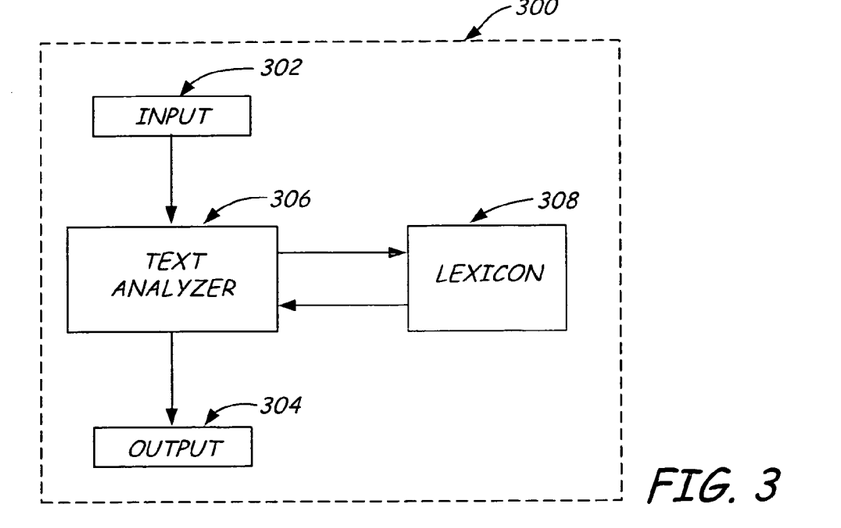
FIG. 3 is a block diagram of a language processing system accessing a lexicon in accordance with the present invention.

FIG. 3 generally illustrates language or text processing system 300 that receives language input 302, commonly in the form of a text string of one or more words, and processes the language input 302 to provide language output 304, also commonly in the form of a text string of one or more words. Language input 302 and output 304 can also be streaming lexical data, where processing system 300 quickly accesses information on lexicon 308 to generate output 304, such as in a speech recognition system.

Generally, language processing system 300 can be embodied as a word breaker (e.g. for a query system), spell checker, grammar checker, speech recognition system, handwriting recognition system, machine translation system, text mining system, or other language processing systems. As appreciated by those skilled in the art, language processing system 300 can be a stand-alone application, module, or component accessible by or included within another system.

Language processing system or application 300 includes text analyzer 306 and lexicon 308. Text analyzer 306 schematically represents components and/or modules that receive input 302, access and receive word information stored in lexicon 308, and process received word information to generate or provide output 304. One aspect of the present invention is an improved data structure for lexicon 308 so as to efficiently provide information to text analyzer 306 as required by a particular application. Lexicon 308 can comprise fundamental aspects or data adapted, used or required to implement or aid in the implementation of numerous applications such as an expansive word stemming system, a query system and/or word breaker, a spell checker, a grammar checker, a speech recognition system, a handwriting recognition system, and a machine translation system.

It should be noted that lexicon 308 can be a separate component that can be used in multiple language processing systems and/or in conjunction with multiple text analyzers. Those skilled in the art can readily recognize how various text analyzers 306 can be adapted to lexicon 308. Lexicon 308 can also be made integral to a particular application or merely accessible to an application. Also, it is understood that text analyzer 306 can reside on computer 110 in FIG. 1, or any computer communicating with the computer 110, such as remote computer 180. Likewise, lexicon 308 can reside on computer 110 in any of the storage devices described above, or be accessible through a suitable communications link.

Figure 4:
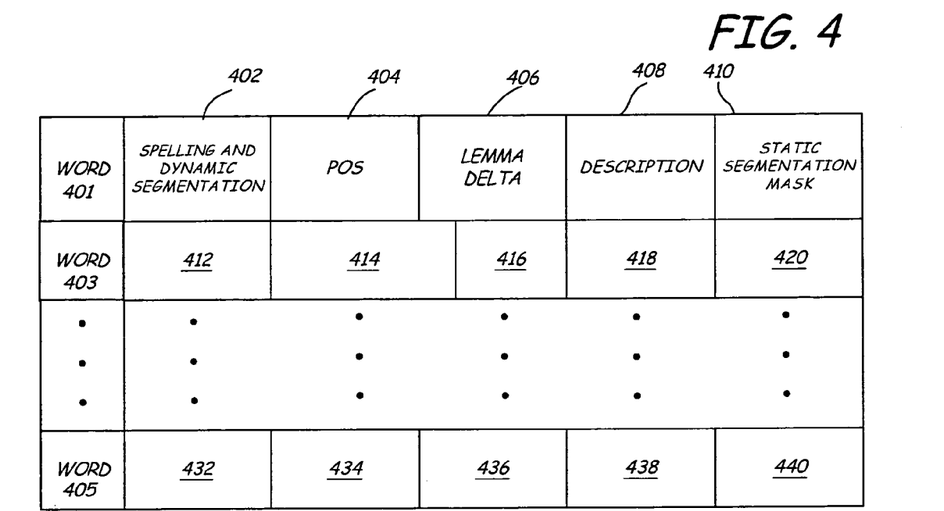
FIG. 4 illustrates data fields in accordance with the present invention.

FIG. 4 illustrates schematically the layout or data structure of words entered into a lexicon of the present inventions, such as lexicon 308. Each entry or word 401, 402, 405 stored in lexicon 308 has associated data fields. For example, word 401 has associated therewith data fields 402, 404, 406, 408, 410. Word 403 has associated therewith data fields 412, 414, 416, 418, 420. Word 405 has associated therewith data fields 432, 434, 436, 438, 440. Preferably, for each entered word, one field 402, 412, 432 comprises spelling and dynamic segmentation information. A second field 404, 414, 434 comprises part-of-speech (POS) information. A third field 406, 416, 436 comprises lemma delta information. A fourth field 408, 418, 438 comprises descriptive information or a description of the entered word, which does not ordinarily include a dictionary-type definition. A fifth field 410, 420, 440 comprises static segmentation information or a static segmentation mask. A static segmentation mask is particularly relevant for compound words such as "bluehounddog," which is described in greater detail herein. In some embodiments, the data fields can be of varying size as illustrated in FIG. 4. In other embodiments, data field size is fixed.

Figure 4A:
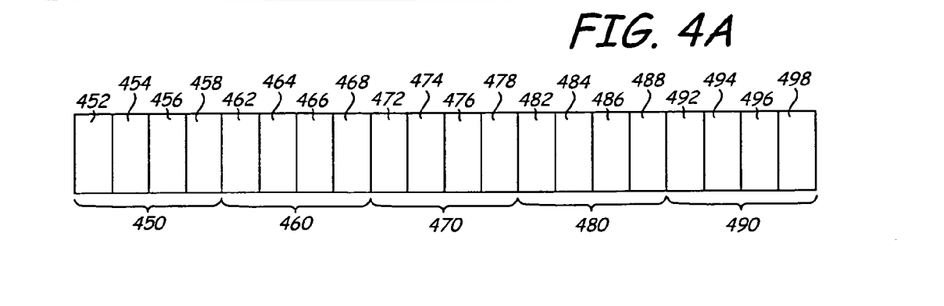
FIG. 4A is an enlargement of data fields illustrated in FIG. 4.

FIG. 4A illustrates in greater detail how a word can be stored in lexicon 308. Data fields 450, 460, 470, 480, 490 correspond to spelling and dynamic segmentation, POS, lemma delta, description, and static segmentation data fields, respectively, as illustrated in FIG. 4. Each field 450, 460, 470, 480, 490 is divided into a plurality of data bytes of information. Spelling and dynamic segmentation field 450 can comprise bytes 452, 454, 456, 458. POS Field 460 can comprise bytes 462, 464, 466, 468. Lemma delta field 470 can comprise bytes 472, 474, 476, 478. Description field 480 can comprise bytes 482, 484, 486, 488. Static segmentation field 490 can comprise bytes 492, 494, 496, 498. In some embodiments, each of the illustrated data bytes can contain 8 bits of data, and therefore, each data field can contain 32 bits of information or $2^{32}$ possible combinations or data values. However, as is well-known, "Huffman encoding" can be used to encode various data fields so lesser amounts of space can be used to encode word information or data up to the maximum amount of storage space (e.g. 5 four-byte fields) allotted for each entry.

Figure 5:
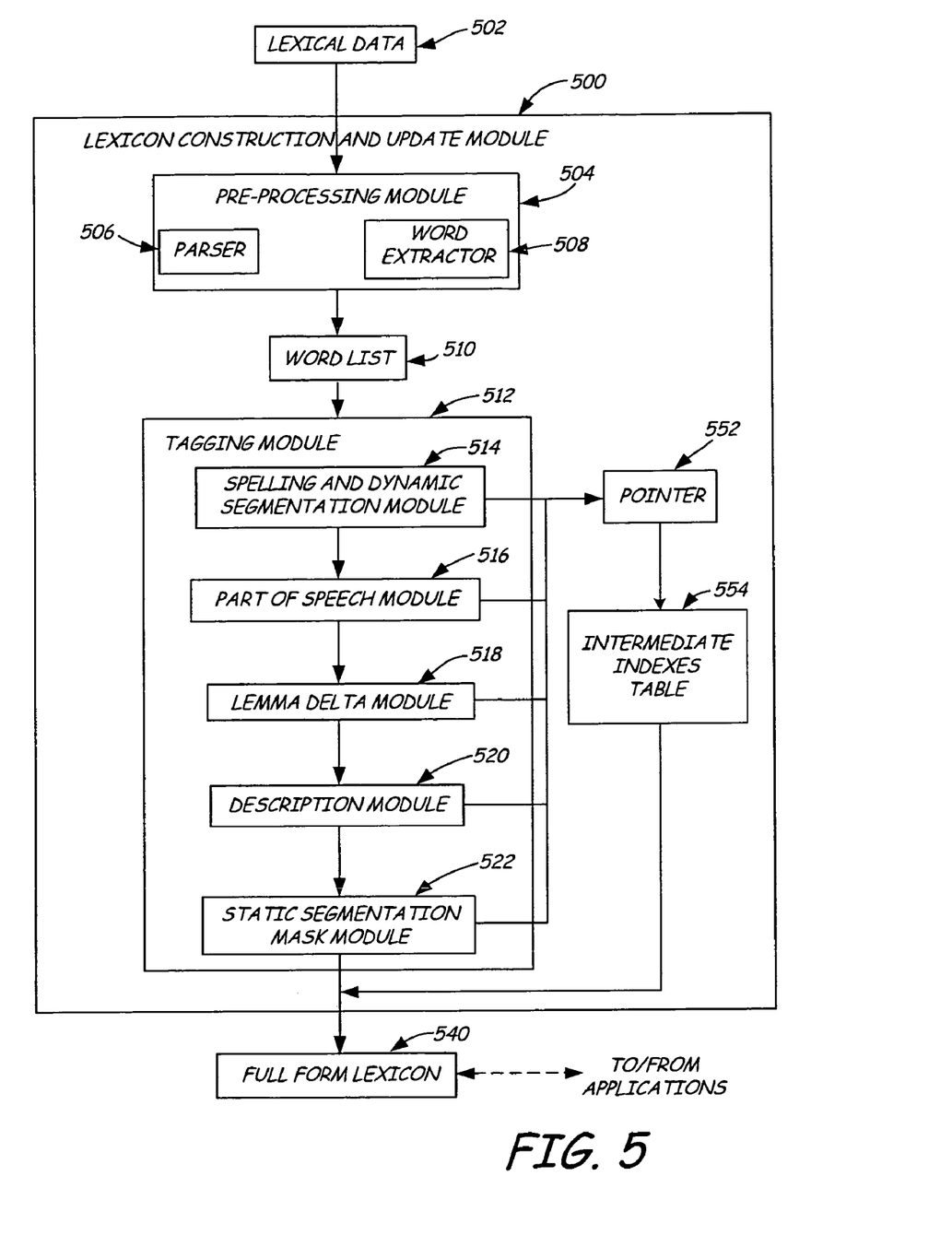
FIG. 5 is a block diagram of one embodiment for constructing the lexicon of the present invention.

FIG. 5 illustrates lexicon construction and update module 500, which constructs lexicon 308, 540 in accordance with the present inventions. Lexical data 502 is received by lexicon construction and update module 500 from any of the input devices or storage devices described above. Lexical data 502 can comprise unprocessed data received from newspapers or printed publications such as journals, magazines, books, and the like. Lexical data 502 can also be text received from web sources or from various speech recognition engines. In alternate embodiments, lexical data 502 can comprise a dictionary of words, especially a language specific dictionary, which limits that amount of pre-processing necessary to build word list or vocabulary 510.

In some embodiments, lexicon construction and update module 500 comprises pre-processing module 504, which generates vocabulary or word list 510 of words to be entered into lexicon 308, 540 for a particular language. Word list 510 can also be a complete list of all words to be initially entered in lexicon 308, 540. Alternately, word list 510 can comprises new words to be added to lexicon 308, 540 in order to augment or update lexicon 308, 540.

It is noted that the present invention balances the amount or richness of information stored for each word entered versus the amount of possible combinations of data across all entries in the lexicon. In most embodiments, well-known "Huffman encoding" having particular tables or columns can be used to implement the present invention as mentioned above. In general, the amount of information for an entry occupies a minimum storage size or space necessary to encode that information. It is important to note that more data patterns shared across entries results in a smaller overall lexicon size. However, as the information for each entry gets richer, the total number of patterns encoded for the entire lexicon becomes larger. This increase in encoded patterns has been analogized to "entropy" and is a key challenge of compression technologies. Thus, the higher the "entropy," the more bits of information that will be required to encode the data without loss. It is, therefore, advantageous to minimize entropy of data stored the lexicon to the extent practicable.

Figure 6:
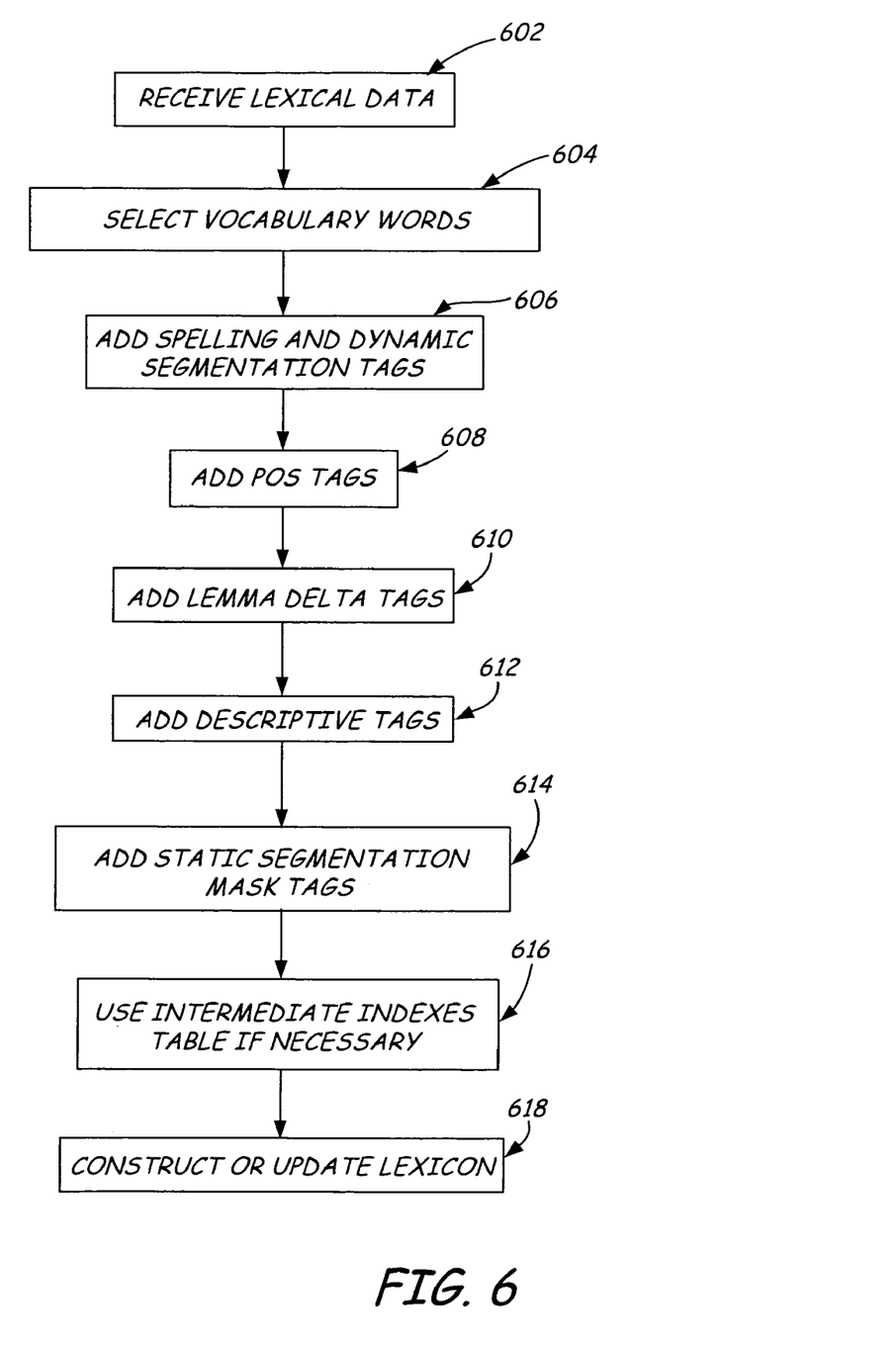
FIG. 6 is a flow diagram illustrating a method of constructing the lexicon of the present invention.

Referring back to FIG. 5, conventionally, pre-processing module 504 can comprise parser 516 that parses or segments lexical data 502 into words and grammatical features such as periods and commas. FIG. 6 illustrates steps of a method to construct lexicon 308, 540. Pre-processing module 504 receives lexical data at step 602 illustrated in FIG. 6 and can comprise word extractor 508 that selects or identifies words at step 604 in lexical data 502 to be added to word list or vocabulary 510. Pre-processing module 504 can be optional, especially in embodiments where lexical data 502 comprises a dictionary or lexicon to be updated in accordance with the present invention.

Word list or vocabulary 510 is received by tagging module 512, which processes or tags words in accordance with the present invention to construct lexicon 308, 540. Generally, tags indicate certain syntactic and/or semantic information about words that is useful when accessed by applications or systems. Tagging module 512 comprises sub-modules that can include any or all of the following: spelling and dynamic segmentation module 514, part of speech module 516, lemma delta module 518, description module 520, and static segmentation mask module 522. Each tagging sub-module adds bits of information or tags for each entry in lexicon 308, 540.

At step 606, spelling and dynamic segmentation module 514 constructs a tag or tags comprising spelling and dynamic segmentation information. In most embodiments, a text spelling of each entered word is associated with a unique identification number. Spelling information can be encoded to indicate how each word in lexicon 308, 540 aids spelling correction applications. For example, in some embodiments, spelling information can include a frequency indication, which can be used by a spell checker to generate or adjust the ranking words in a suggestion set when a possible misspelling is encountered. Spelling information can also include whether a word should be checked for correctness but not generated in a suggestion set. This information is particularly useful for words that are considered improper or vulgar. Such encoded information would permit a vulgarity to be checked for spelling but never become part of a suggestion set of alternate words for a misspelling. Spelling information can also include information for spell checking words in different dialects of the same language. For example, American English uses the term "color" while British English has another spelling "colour." Thus, a spelling tag can indicate, for example, that "colour" is spelled correctly in British English but misspelled in American English.

Additionally, spelling and dynamic segmentation module 514 comprises dynamic segmentation information. Dynamic segmentation information includes bits of information that can be accessed by a verification process that determines whether constituent words are legally combined in a compound term. In some embodiments, the verification process causes a word to be mapped to two or more separate lexical entries in order to recognize a valid compound term in a selected language.

For example, the compound term "bluehounddog" has constituent words "blue," "hound," and "dog" that can be marked with segmentation bits or values. During application runtime these bits can be accessed to determine if the constituent words are correctly combined and thus a valid compound term. Dynamic segmentation bits can also indicate a position of one constituent word relative to another, such as a prefix, suffix, etc., which is especially important in extensive compounding languages such as German. In other embodiments, a constituent word can comprise more than one code, such as commonly occurs in Spanish.

It should be noted that lexicon 308, 540 should not "over-accept" word compounds. In other words, constituent words should not indicate that they can be combined if the compound is not valid in a particular language. Thus, in the present invention, adapting a particular language to the lexicon is language specific. For instance, German language rules for compound terms are very different than for Spanish. However, module 514 can encode appropriate dynamic segmentation information for constituent words in either language using bits stored in spelling and dynamic segmentation field 450.

In some embodiments, module 514 encodes dynamic segmentation information for a possible first word of a compound with a particular code or value. A possible attachment to the first word is encoded as an attachment and further encoded with another code that indicates that it can be attached to the first word. In short, there generally is a matrix of possible combination rules—phonetic, syntactic, and/or morphological—for building compounds in a lexicon for a particular language. However, it is advantageous that applications can quickly access information stored in the lexicon. At step 608, part of speech module 516 adds information relating to part of speech (POS), such as whether a word is a noun, verb, or adjective. However, more detailed POS information can be included. For example, a plural noun can have a unique code relative to the singular form of the same noun. One important application for the POS tag is to distinguish the role of a word in a given sentence or string. For instance, the word "dog" can have two distinct POS tags: one tag indicates its role as a noun, the other as a verb. In the string "I pet the dog", the term "dog" is a noun. However, in the sentence "I dogged after my big brother", the base term "dog" serves as a verb. A word's specific role can be determined in conjunction with surrounding terms and POS tags encoded for individual words that define relationships between the words. It is noted that POS tags can also be used with rule sets to perform simple syntactic parsing commonly known as "chunk" or "island" parsing. In syntactic parsing, POS tags and other information, such as tense can be used to recognize small "chunks" of adjacent terms as a sentence to be linked as a single syntactic unit.

At step 610, lemma delta module 518 encodes information on how two words (e.g. an inflection and lemma) differ from each other. In some embodiments, up to 4 bytes of information are encoded in lemma delta field 470, which essentially are steps for transforming one word (e.g. inflection or derivative) into another word (e.g. the base word or lemma). Suppose the word "runs" is entered in lexicon 308, 540. In the present invention, the word "runs" can be transformed to its lemma "run" using, for example, up to four states or steps necessary to make a complete transformation. Generally, the present invention attempts to encode the most common steps (e.g. 15 possible steps) necessary to transform inflections or derivations to corresponding lemmas for a given language.

In most embodiments, a four-state state machine transforms or maps words into other words using an "op code" followed by an "argument value". In the example where "runs" is transformed to "run", the op code can be to "cut a suffix" or "CutSuffix" and the argument value can be "1" (i.e. the number of letters cut from the end of "runs"). In some embodiments, 15 different op codes can be used to record a transformation. For example, "cut a prefix" or "CutPrefix" can be another op code indicating cutting the beginning of a word followed by an argument value or the number of letters cut. Some op codes are used only rarely. In one illustrative embodiment, 4 bits of information are encoded to indicate an op code followed by a 4-bit argument value. Thus, 8 bits of information or 1 byte can be encoded by lemma delta module 518 for each step, or a maximum of 4 bytes in lemma delta field 470.

Other transformation steps can include an op code "AddSuffix" where a suffix is added having an argument value corresponding to a particular identifier. Each identifier is associated with a particular suffix such as "s" or "er". Such identifiers are in a defined list.

Another op code "AddSuffixChar" can be used where the suffix added is not from a defined list but rather includes an argument having the actual suffix characters. It should be noted this form of op code can take up twice as much storage space (e.g. 2 bytes).

An op code "AddPrefix" is similar to "AddSuffix" but includes an argument value corresponding to a particular identifier for a prefix from a defined list.

An op Code "AddPrefixChar" is similar to "AddSuffixChar" but includes an argument value corresponding to actual characters for a prefix.

An op code "ToUpper" can be used to change a character to an upper case letter, where an argument value provides the character position. Similarly, an op code "ToLower" changes a character to a lower case letter where the argument value provides the character position.

An op code "RemoveAccent" can be used to remove an accent from a character where the argument value provides the character position.

An op code "AddAcuteAccent" can be used to add an acute accent to a character where the argument value provides the character position. Similarly, op code "AddGraveAccent" can be used to add a grave accent at a particular character position defined by the argument value. An op code "AddDiaeresis" can be used to add a diaeresis at a character position defined by the argument value. An op code "AddCircumflexAccent" can be used to add a circumflex accent at a character position defined by the argument value. Likewise, an op code "AddTilde" can be used to add a tilde at a character position defined by the argument value.

Finally, an op code "SubstituteChar" can be used to substitute a particular character at a particular position. In this case, there can be two argument values, one associated with the character, and one associated with the selected position.

At step 612, description module 520 encodes information conveying basic meaning, such as person, gender, tense, number, or whether a term can be part of a named entity in description field 480. For example, a word string such as "John Smith" can be encoded so that "John" is encoded as a first name and "Smith" is encoded as a last name. The word "he" can be encoded as third person, singular, and male. The word "ran" can be encoded as first, second, and third person, and past tense. In systems or applications having, for example, named entity detection, the lexicon of the present invention can be accessed to determine when a string of words is a named entity which should be collectively rather that individually processed. Other descriptive bits such as person, gender, tense, and number are useful in applications such as spelling and grammar correction. In some embodiments, descriptive information in descriptive field 480 can occupy up to a 4-byte data field as previous data fields 450, 460, 470.

At step 614, static segmentation mask module 522 encodes information in static segmentation mask field 490. The encoded information comprises a segmentation or a series of cut points that divide a word, especially a compound word into different segments and lengths. For example, in the compound term "bluehounddog," the cut points or segment lengths can be 4, 5, and 3 (4 characters for blue, 5 characters for hound, and 3 characters for dog). The segment lengths can be used at runtime to reconstruct the constituent words of the compound, such as in a search engine. In some embodiments, the last digit 3 can be dropped because it is implied from the first two cut points at 4 and 5. Dropping the final segmentation length (e.g. 3 in the "hounddog" example) is advantageous for reducing the amount of storage space needed due to the reduced number of code combinations. In other embodiments, it is possible to have more than one segmentation for a particular compound term. Thus, "bluehounddog" can be segmented as 4, 5, 3 and/or 4, 5. Other segmentations can include 4, 8 and/or 4 (4 for "blue" and 8 for "hounddog") where "hounddog" is segmented as a single constituent word. Thus, static segmentation mask module 522 can generate multiple sets of segmentations to be stored in lexicon 308, 540 for a particular compound term.

In the foregoing embodiment, static segmentation mask information comprises values indicative of the length of constituent words. However, in an alternative embodiment, values can be indicative of a character indicative of the first or last character of a constituent word. Thus, in the example "bluehounddog", possible segmentations can include 5, 10 or 4, 9 because values 5, 10 and 4, 9 are indicative of first and last characters, respectively, of constituent words.

In some embodiments, encoded information or "tags" associated with each entry or word in the lexicon can be stored as up to 5 four-byte quantities where each of spelling and dynamic segmentation module 514, part of speech module 516, lemma delta module 518, description module 520, and static segmentation mask module 522 stores or causes the storage of a four-byte quantity of information. However, in other embodiments other data quantities or additional fields can be used for entries in lexicon 308, 540 as desired.

It should be noted that in some situations, data cannot be encoded into one of the five tags as described above. In such situations, at step 616, data can be encoded with a second mechanism that uses pointer 552 that points to known intermediate indexes table (IIT) 554, in which such data is stored. Such intermediate indexes tables were described in U.S. patent application Publication No. US2003/0204392A1 entitled "Lexicon with Sectionalized Data and Method of Using the Same," filed on Oct. 30, 2003, the content of which is hereby incorporated by reference in its entirety.

Generally, there are several types of extended data supported in this manner. The first type is for entries that have more than one lemma. Because only the first or primary lemma can be stored in tags by lemma delta module 518, subsequent lemmas must be stored in IIT 554 to be available at runtime. Subsequent lemmas stored in IIT 554 can be stored with a given data value or word identification number associated with each word. At runtime, this unique data value can be used to reconstruct the lemma string needed for a given entry.

In some embodiments, the storage layout of ITT 554 comprises an array of four-byte values where a one-byte value indicates "type" of the entry and a three-byte value encodes the identification code of the lemma. An inflection, etc. is stored in the same manner but marked with different identification code to indicate the entry is a particular inflection type. Another type of data stored in IIT 554 comprises probability information for a given part of speech tag occurring in a sentence of text. For example, in the example where "dog" can be a noun or verb, the probability of "dog" being a noun is different and undoubtedly higher than the probability that "dog" is used as a verb in any sentence. This probability information can be stored in a manner similar to lemmas and inflections. For example, a total of four bytes of information can be stored where a one-byte value indicates "type" and a three-byte value is associated with the particular word in vocabulary 510.

At step 618, lexicon construction and update module 500 generates or provides data fields 450, 460, 470, 480, 490 to construct lexicon 308, 540 for a particular language. Lexicon construction and update module 500 can generate a lexicon in any language, e.g. English, German, Spanish, Chinese, Korean, etc. In other embodiments, module 500 updates lexicon 308, 540 with new words from word list 510. Such a lexicon update functionality permits lexicon construction and update module 500 to continuously monitor, for example, lexical data (e.g. publications or web sites) for new words to be added to lexicon 308, 540 as the words become available. In still other embodiments, lexicon construction and update module 500 can generate subset lexicons for specific purposes. For example, it can be advantageous to have different lexicons directed to specific scientific, engineering, sports, cultural, or artistic endeavors that comprise words used in those endeavors. Lexicons limited to particular endeavors would advantageously tend to limit the overall size of the lexicon because some words are common in some endeavors but not others. Also, some words can be used or spelled differently depending on endeavors.

Although the present invention has been described with reference to particular embodiments, workers skilled in the art will recognize that changes may be made in form and detail without departing from the spirit and scope of the invention.

What is claimed is:

1. A computer readable storage medium having instructions, which when performed by a computing device, operate as a language processing system having a text analyzer, the text analyzer configured to receive and analyze input text by accessing a lexicon stored on the computer readable storage medium and provide an output in accordance with accessing information from the lexicon, the lexicon comprising a plurality of entries, each entry corresponding to a word entered in the lexicon, wherein each entry comprises:

a first field comprising spelling information for an entered word;

a second field comprising part of speech information associated with the entered word; and a third field comprising lemma delta information associated with the entered word, wherein the lemma delta information comprises transformation information associated with the entered word, the transformation information comprising an op code and an argument value, wherein the op code is indicative of an operation to perform upon the entered word based on the argument value in order to convert the entered word into a second word.

2. The computer readable storage medium of claim 1, wherein the spelling information comprises an identification value corresponding to the entered word.

3. The computer readable storage medium of claim 1, wherein the first field further comprises dynamic segmentation information associated with the entered word.

4. The computer readable storage medium of claim 3, wherein the dynamic segmentation information comprises information for determining whether the entered word can be mapped to at least two separate lexical entries to recognize a valid compound term in a selected language.

5. The computer readable storage medium of claim 3, wherein the first field comprises up to 4 bytes of storage space.

6. The computer readable storage medium of claim 1, wherein the part of speech information comprises a plurality of parts of speech associated with the entered word.

7. The computer readable storage medium of claim 6, wherein the part of speech information comprises up to four parts of speech, wherein each part of speech occupies up to 1 byte of storage space.

8. The computer readable storage medium of claim 6, and further comprising an intermediate indexes table accessible by the language processing system, the intermediate indexes table comprising probability information for each of the parts of speech associated with the entered word.

9. The computer readable storage medium of claim 1, wherein the second word is a lemma corresponding to the entered word.

10. The computer readable storage medium of claim 1, wherein the transformation information comprises up to four op codes and corresponding argument values.

11. A computer readable storage medium having instructions, which when performed by a computng device, operate as a language processing em having text analyzer, the text analyzer configured to receive and analyze input text by accessing a lexicon stored on the computer readable storage medium and provide an output in accordance with accessing information from the lexicon, the lexicon comprising a plurality of entries, each entry corresponding to a word entered in the lexicon, wherein each entry comprises:
   a first field comprising spelling information for an entered word;
   a second field comprising part of speech information associated with the entered word; and
   a third field comprising lemma delta information associated with the entered word;
   a fourth field comprising description information associated with the entered word; and
   a fifth field comprising static segmentation mask information associated with the entered word.

12. The computer readable storage medium of claim 11, wherein the description information comprises up to 4 bytes of information.

13. The computer readable storage medium of claim 11, wherein the description information comprises named entity information.

14. The computer readable storage medium of claim 13, wherein the named entity comprises a proper pronoun.

15. The computer readable storage medium of claim 11, wherein the description information comprises information for at least one of person, tense, number, and gender associated with the entered word.

16. The computer readable storage medium of claim 11, wherein the static segmentation mask information comprises at least one constituent word length of the entered word, the entered word being a compound term of two or more constituent words.

17. The computer readable storage medium of claim 11, wherein the language processing system comprises an expansive stemming system.

18. The computer readable storage medium of claim 17, wherein the lexicon comprises data adapted for the expansive stemming system.

19. The computer readable storage medium of claim 11, wherein the lexicon comprises data adapted for a spell checker.

20. The computer readable storage medium of claim 11, wherein the lexicon comprises data adapted for a grammar checker.

21. The computer readable storage medium of claim 11, wherein the lexicon comprises data adapted for a speech recognition system.

22. The computer readable storage medium of claim 11, wherein the lexicon comprises data adapted for a handwriting recognition system.

23. The computer readable storage medium of claim 11, wherein the lexicon comprises data adapted for a machine translation system.

24. The computer readable storage medium of claim 11, wherein the first field further comprises dynamic segmentation information associated with the entered word.

25. The computer readable storage medium of claim 24, wherein the dynamic segmentation information comprises information for determining whether the entered word can be mapped to at least two separate lexical entries to recognize a valid compound term in a selected language.

26. The computer readable storage medium of claim 24, wherein the first field comprises up to 4 bytes of storage space.

27. The computer readable storage medium of claim 11, wherein the part of speech information comprises a plurality of parts of speech associated with the entered word.

28. The computer readable storage medium of claim 27, wherein the part of speech information comprises up to four parts of speech, wherein each part of speech occupies up to 1 byte of storage space.

29. The computer readable storage medium of claim 27, and further comprising an intermediate indexes table accessible by the language processing system, the intermediate indexes table comprising probability information for each of the parts of speech associated with the entered word.

30. A computer readable storage medium having instructions, which when performed by a computing device, operate as a language processing system having a text analyzer, the text analyzer configured to receive and analyze input text by accessing a lexicon stored on the computer readable storage medium and provide an output in accordance with accessing information from the lexicon, the lexicon comprising information for entered words, wherein for each entered word, corresponding word information is stored in data fields, the data fields comprising:
   a spelling and dynamic segmentation field related to the entered word;
   a part of speech field related to the entered word;
   a lemma delta field related to the entered word;
   a description field for the entered word; and
   a static segmentation mask field for the entered word.

31. The computer readable storage medium of claim 30, wherein each field occupies up to 4 bytes of storage space.

32. A method of constructing a lexicon comprising information about words, for each word, the method comprising steps of:

storing spelling and dynamic segmentation information;
storing part of speech information;
storing lemma delta information;
storing description information for each word; and
storing static segmentation mask information for words that are compound terms.

33. The method of claim 32, and further comprising storing information in a intermediate indexes table for some words in the lexicon.

34. The method of claim 33, wherein storing information comprises storing lemma delta information for the some words.

35. The method of claim 33, wherein storing information comprises storing probability information corresponding to parts of speech information for the some words.

36. A method of updating a lexicon, the method comprising the steps of claim 32, and further comprising:

selecting new words not currently in the lexicon and storing information corresponding to the selected words to update the lexicon.

* * * * *

UNITED STATES PATENT AND TRADEMARK OFFICE
CERTIFICATE OF CORRECTION

| | | |
|---|---|---|
| PATENT NO. | : 7,421,386 B2 | Page 1 of 1 |
| APPLICATION NO. | : 10/804998 | |
| DATED | : September 2, 2008 | |
| INVENTOR(S) | : Kevin R. Powell et al. | |

It is certified that error appears in the above-identified patent and that said Letters Patent is hereby corrected as shown below:

In column 13, line 29, in Claim 11, delete "computng" and insert -- computing --, therefor.

In column 13, line 30, in Claim 11, delete "em" and insert -- system --, therefor.

In column 13, line 30, in Claim 11, after "having" insert -- a --.

Signed and Sealed this

Twenty-sixth Day of April, 2011

David J. Kappos
*Director of the United States Patent and Trademark Office*